US009652811B2

(12) United States Patent
Chao

(10) Patent No.: US 9,652,811 B2
(45) Date of Patent: May 16, 2017

(54) GENERATING GRAPHIC OBJECT COLLAGES

(75) Inventor: Hui Chao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1454 days.

(21) Appl. No.: 13/260,333

(22) PCT Filed: Sep. 9, 2009

(86) PCT No.: PCT/US2009/056336
§ 371 (c)(1),
(2), (4) Date: Sep. 25, 2011

(87) PCT Pub. No.: WO2011/031257
PCT Pub. Date: Mar. 17, 2011

(65) Prior Publication Data

US 2012/0147046 A1 Jun. 14, 2012

(51) Int. Cl.
*G06T 3/40* (2006.01)
*G06Q 50/10* (2012.01)

(52) U.S. Cl.
CPC .................................... *G06Q 50/10* (2013.01)

(58) Field of Classification Search
CPC .................................................... G06T 3/4038
USPC .......... 345/619–622, 635, 641; 382/284, 294
See application file for complete search history.

(56) References Cited

U.S. PATENT DOCUMENTS 7,403,211 B2 * 7/2008 Sheasby et al. .............. 345/661
2002/0122067 A1 9/2002 Geigel et al.
2004/0179026 A1 9/2004 Rix
2007/0208996 A1 9/2007 Berkner et al.
2008/0222560 A1 9/2008 Harrison
2009/0148064 A1 * 6/2009 Schulz .......................... 382/284
2010/0321405 A1 * 12/2010 MacInnes et al. ............ 345/635

FOREIGN PATENT DOCUMENTS

JP 10-232945 A 9/1998
JP 2004-104161 A 4/2004
KR 10-2004-0073870 A 8/2004

OTHER PUBLICATIONS

Christian Spielberger et al., "Inner Approximation of Polygons and Polyhedra by Unions of Boxes," EWCG 2006, Delphi, Mar. 27-29, 2006.
International Search Report and Written Opinion dated May 11, 2010, issued on PCT Patent Application No. PCT/US/2009/056336 filed on Sep. 9, 2009, The State Intellectual Property Office, Korea.

* cited by examiner

*Primary Examiner* — Matthew Salvucci
(74) *Attorney, Agent, or Firm* — Mannava & Kang, P.C.

(57) ABSTRACT

A regular mesh of rectangular cells (76) of uniform size is defined. The regular mesh is aligned with a non-rectangular layout boundary (18) such that a count of ones of the cells (76) having at least a prescribed fraction of their size contained within the layout boundary (18) is maximized. A layout (34) of frames (36) within the layout boundary (18) is determined based on the locations of the cells (76) with respect to the layout boundary (18), wherein the frames (36) define respective size dimensions and positions of respective views (47) of graphic objects (12) on a page (38). The views (47) of the graphic objects (12) arranged in accordance with the layout (34) of the frames (36) are outputted on the page (38).

20 Claims, 7 Drawing Sheets

GENERATING GRAPHIC OBJECT COLLAGES

BACKGROUND

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several digital image collage generation systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Some automated digital image collage generation systems allow users to organize digital images into album pages in accordance with dates and times specified in the metadata associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template. Other digital image collage generation systems are designed to produce album pages automatically with minimal input from the user.

What are needed are improved systems and methods of generating image collages.

SUMMARY

In one aspect, the invention features a method in accordance with which a regular mesh of rectangular cells of uniform size is defined. The regular mesh aligned with a non-rectangular layout boundary such that a count of ones of the cells having at least a prescribed fraction of their size contained within the layout boundary is maximized. A layout of frames within the layout boundary is determined based on the locations of the cells with respect to the layout boundary, wherein the frames define respective size dimensions and positions of respective views of graphic objects on a page. The views of the graphic objects arranged in accordance with the layout of the frames on the page are outputted.

The invention also features apparatus operable to implement the method described above and computer-readable media storing computer-readable instructions causing a computer to implement the method described above.

DETAILED DESCRIPTION

Figure 1:
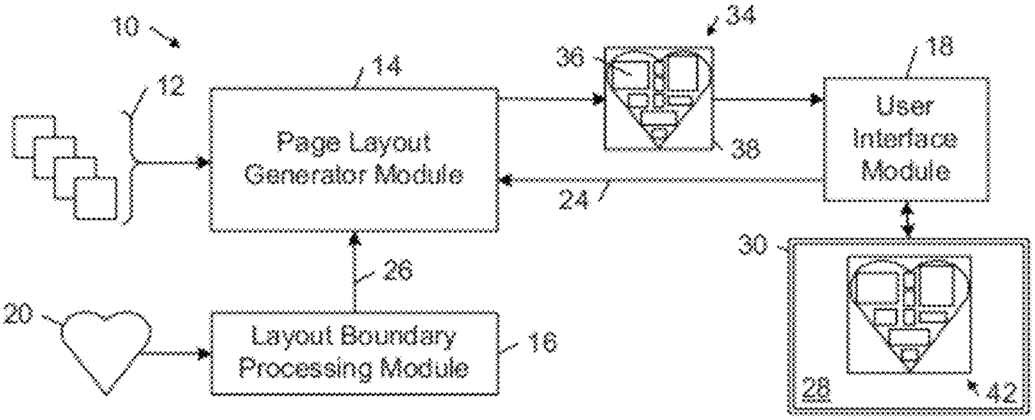
FIG. 1 is a block diagram of an embodiment of a graphic object collage generation system.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "graphic object collage" is a composition of graphic objects on a page.

The term "graphic object" refers broadly to any type of visually perceptible content that may be rendered on a physical or virtual page, including images and text. Image-based graphic objects (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. The term “graphic object” encompasses both a single-element graphic object and a multi-element graphic object formed from a cohesive group or collection of one or more graphic objects. The assignment of single-element graphic objects to a particular multi-element graphic object signifies that the constituent single-element graphic objects are related. In general, the types of the single-element graphic objects in a multi-element graphic object may be the same or different. In the illustrated embodiments, each of the graphic objects has a respective aspect ratio, which is the ratio of graphic objects height to graphic objects width. Each variable-area graphic object may be assigned a respective positive scalar-valued nominal size. The term “nominal size” (also referred to as “relative area”) refers to a designated or theoretical size that may or may not vary from the actual or rendered size, where the “size” of a graphic object is the amount of area of a page that is occupied by the graphic object. In some embodiments, the user is allowed to set the nominal size values that are assigned to the graphic objects. In other embodiments, the graphic object collage generation system automatically assigns the nominal size values to the graphic objects.

As used herein, the term “page” refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

A “computer” is any machine, device, or apparatus that processes data according to computer-readable instructions that are stored on a computer-readable medium either temporarily or permanently. A “computer operating system” is a software component of a computer system that manages and coordinates the performance of tasks and the sharing of computing and hardware resources. A “software application” (also referred to as software, an application, computer software, a computer application, a program, and a computer program) is a set of instructions that a computer can interpret and execute to perform one or more specific tasks. A “data file” is a block of information that durably stores data for use by a software application.

As used herein, the term “includes” means includes but not limited to, the term “including” means including but not limited to. The term “based on” means based at least in part on. The term “ones” means multiple members of a specified group.

II. Overview

The embodiments that are described herein provide systems and methods that enable graphic object collages that conform to non-rectangular layout boundaries to be generated.

FIG. 1 shows an embodiment of a graphic object collage generation system 10 for arranging graphic objects 12 on one or more pages. The graphic object collage generation system 10 includes a page layout generator module 14, a layout boundary processing module 16, and a user interface module 18 through which a user interacts with the graphic object collage generation system 10. In operation, graphic object collage generation system 10 processes the graphics objects 12 and the layout specification 20 to produce an image collage 42'in accordance with instructions 24 that are received from the user interface module 18. In this process, the layout boundary processing module 16 processes a specification of a layout boundary 20, and the page layout generator module 14 arranges ones of the graphics objects 12 on a page in an arrangement that conforms with the layout boundary 20 based on the processing results 26 produced by the layout boundary processing module 16. The layout boundary 20 may correspond to any regular or non-regular, non-rectangular shape, including for example, circular shapes, elliptical shapes, non-rectangular polygonal shapes, and arbitrary shapes. The user interface module 18 generates a user interface 28, which is displayed on a display 30.

Figure 2:
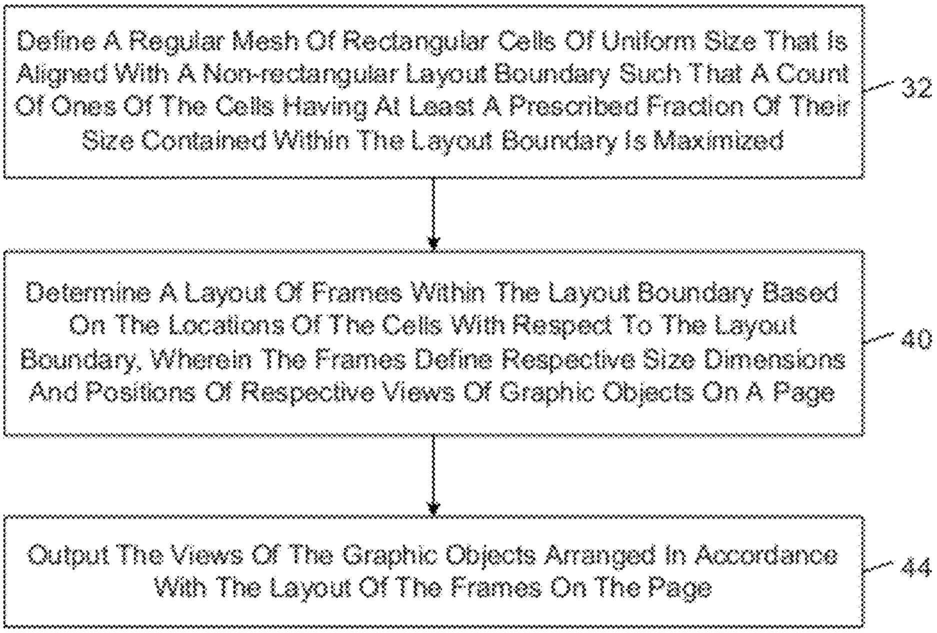
FIG. 2 is a flow diagram of an embodiment of a method of generating a graphic object collage.

FIG. 2 shows an embodiment of a method by which the graphic object collage generation system 10 generates a respective layout of ones of the graphic objects 12 on a page.

In accordance with the method of FIG. 2, the layout boundary processing module 16 defines a regular mesh of rectangular cells of uniform size that is aligned with a non-rectangular layout boundary such that a count of ones of the cells having at least a prescribed fraction of their size contained within the layout boundary is maximized (FIG. 2, block 32). The page layout generator module 14 determines a layout 34 of frames 36 within the layout boundary on a page 38 based on the locations of the cells with respect to the layout boundary, where the frames define respective size dimensions and positions of respective views of graphic objects on a page (FIG. 2, block 40). The user interface outputs the image collage 42, which corresponds to a layout the views of the graphic objects arranged in accordance with the layout 34 of the frames 36 on the page 38 (FIG. 2, block 44).

Figure 3:
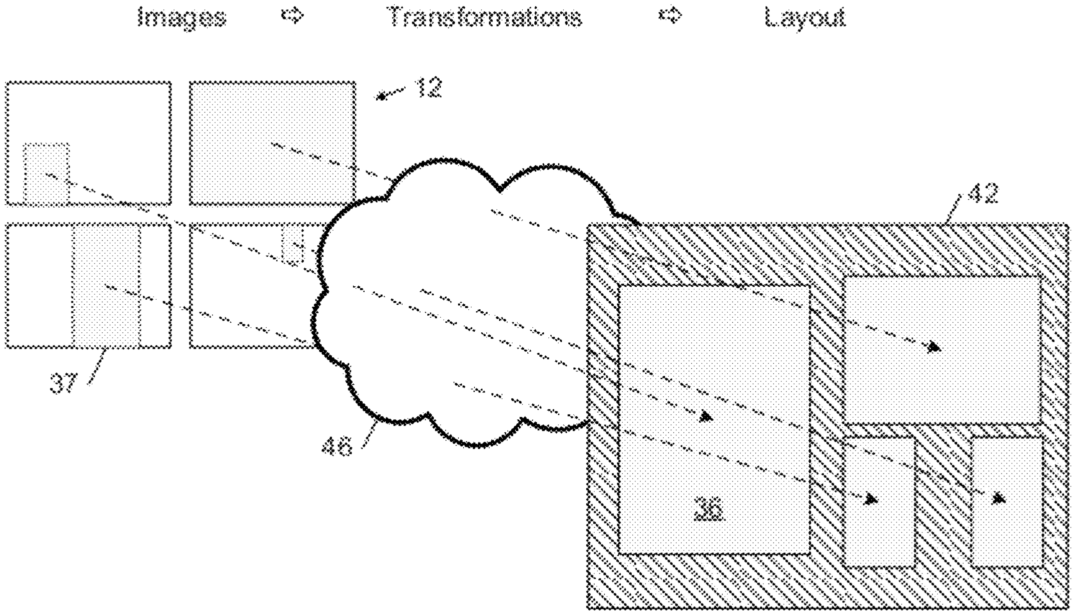
FIG. 3 is a diagrammatic illustrative view of graphic objects undergoing transformation and projection onto a layout of frames.

Referring to FIG. 3, each frame 36 defines a respective view 37 of at least a portion (shown shaded) of a respective one of the graphic objects 12. The user interface module projects the views 37 of the graphic objects onto the frames 36 to produce the graphic object layout 42 in the user interface 28 shown in FIG. 1. As shown diagrammatically in FIG. 3, the image content in each view is subjected to zero or more transformations 46 (e.g., scaling, cropping, and filtering operations) before being projected onto the frames 36. The page layout generator module 14 typically generates specification of the layout 34 that includes a specification of size dimensions and positions of the frames 36 on the page 38 and an association between each of the frames 36 and a respective view of a respective one of the graphic objects 12.

The modules 14-18 of the graphic object collage generation system 10 are not limited to a specific hardware or software configuration, but rather they may be implemented in any computing or processing environment, including in digital electronic circuitry or in computer hardware, firmware, device driver, or software. For example, in some implementations, these modules may be embedded in the hardware or software of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some implementations, computer process instructions for implementing the modules 14-18 and the data generated by the modules 14-18 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

III. Exemplary Embodiment of the Graphic Object Collage Generation System

A. Introduction

Figure 4:
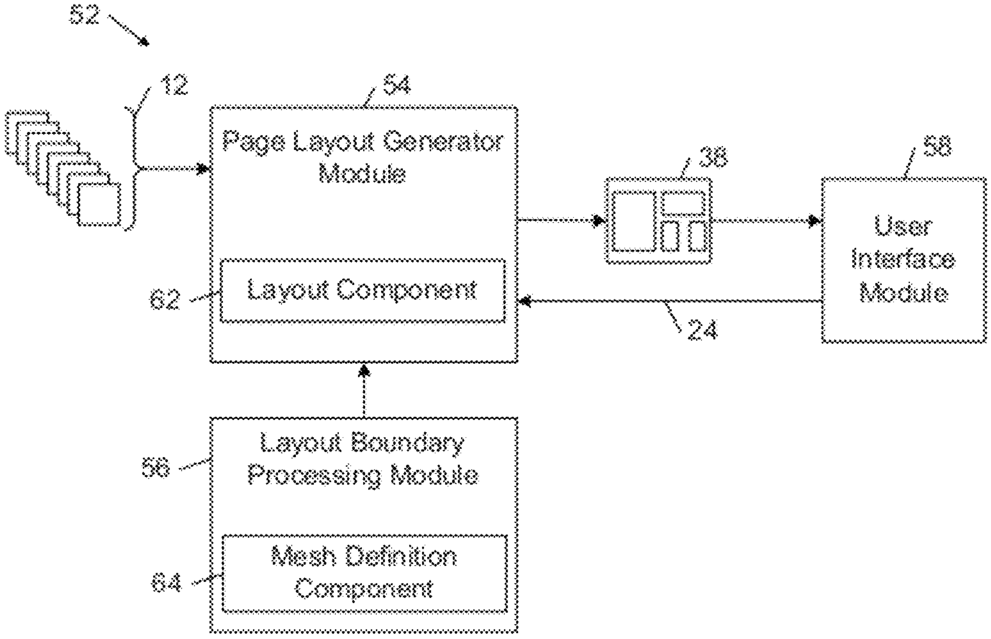
FIG. 4 is a block diagram of an embodiment of the graphic object collage generation system of FIG. 1.

FIG. 4 shows an embodiment 52 of the graphic object collage generation system 10 that includes an embodiment 54 of the page layout module 14, an embodiment 56 of the layout boundary processing module 16, and an embodiment 58 of the user interface module 18.

The page layout generator module 54 includes a layout component 62. The layout component 62 determines the layout of frames within the layout boundary based on the locations of the cells with respect to the layout boundary (FIG. 2, block 40).

The layout boundary processing module 56,includes a mesh definition component 64 that defines the regular mesh of rectangular cells that is aligned with a non-rectangular layout boundary such that a count of ones of the cells having at least a prescribed fraction of their size contained within the layout boundary is maximized (see FIG. 2, block 32).

The user interface module 58 provides seamless access to the functionalities of the graphic object collage generation system 52 in a natural and intuitive way so that users do not have to memorize what the automation tools do or how they work. In addition, the user interface creates a fluid transition experience between fully manual functions and fully automatic functions.

B. Layout Boundary Processing Module

In the layout boundary processing module 56, the mesh definition component 64 defines the regular mesh of rectangular cells that is aligned with a non-rectangular layout boundary such that a count of ones of the cells having at least a prescribed fraction of their size contained within the layout boundary is maximized (see FIG. 2, block 32).

Figure 5:
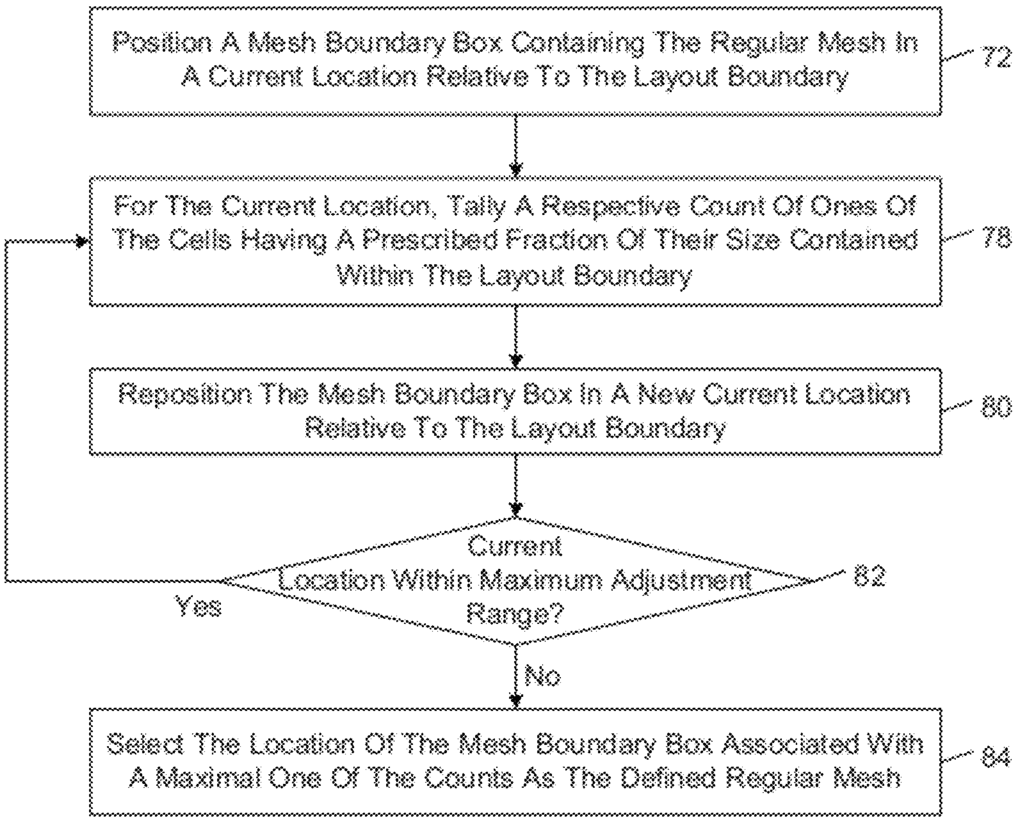
FIG. 5 is a flow diagram of an embodiment of a method of defining a regular mesh.

FIG. 5 shows an embodiment of a method by which the mesh definition component 64 defines a regular mesh of rectangular cells in relation to the exemplary layout boundary 18.

Figure 6A:
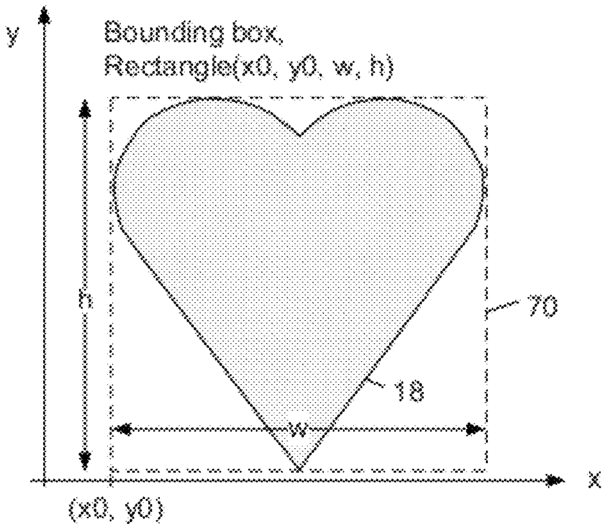
FIGS. 6A-6C are diagrammatic views of an embodiment of bounding boxes positioned at different locations in relation to a heart-shaped layout boundary in accordance with an embodiment of the invention.
Figure 6B:
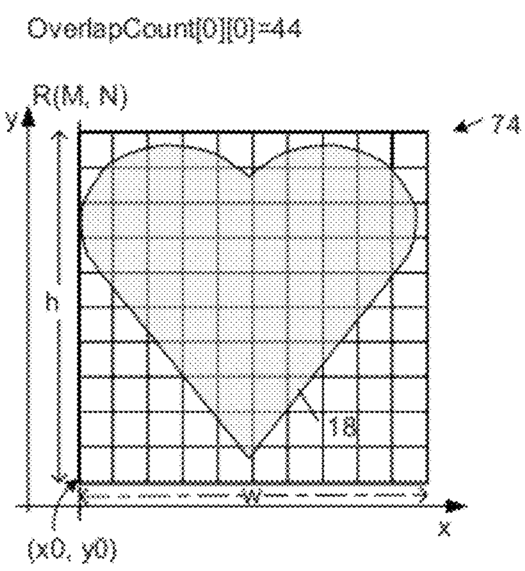

In accordance with the method of FIG. 2, the mesh definition component 64 positions a mesh boundary box containing the regular mesh in a current location relative to the layout boundary 18 (FIG. 5, block 72). Referring to FIG. 6A, the mesh definition component initially determines an initial bounding box 70 that is the smallest rectangle that encloses the layout boundary 18. In the illustrated embodiment, the initial bounding box 70 is denoted by Rectangle (x0, y0, w, h), where x0, y0 are the Cartesian coordinates of the lower left corner of the initial bounding box 70, and w and h are the width and height dimensions of the initial bounding box 70. Referring to FIG. 6B, the mesh definition component 64 determines a mesh bounding box 74 that contains a set, R(M,N), of the rectangular cells 76 that are in the initial bounding box 72, where M=round(w/cw+0.5), N=round(h/ch+0.5), and round( )is the rounding operator that rounds the operand to the nearest integer. Each of the rectangular cells has a respective cell width, cw, and a respective height, ch. In some embodiments, the cell width and cell height respectively are equal to the width and height dimensions of the smallest allowable graphic object on the page.

For the current location of the mesh bounding box 74 with respect to the layout boundary 18, the mesh definition component 64 tallies a respective count OverlapCount[0][0] in the embodiment shown in FIG. 6B) of ones of the cells having a prescribed fraction of their size contained within the layout boundary 18 (FIG. 5, block 78).

The mesh definition component 64 repositions the mesh bounding box 74 in a new current location relative to the layout boundary 18 (FIG. 5, block 80). In this process, the mesh definition component 64 typically moves the mesh bounding box 74 sequentially by incremental amounts along a first dimension (e.g., the x-direction) and then along the other dimension (e.g., the y-direction). The incremental amounts typically are a fraction of the width and height dimensions (cw, ch) of the cells 76.

Figure 6C:
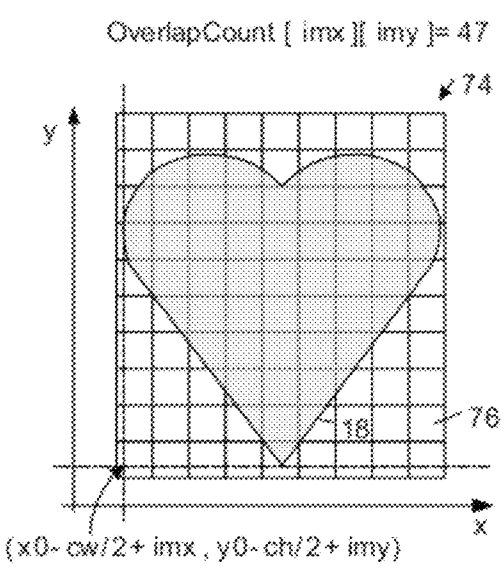

If the current location of the mesh boundary box 76 is within a specified maximum adjustment range (FIG. 5, block 82), the process is repeated (FIG. 5, blocks 78-82). Otherwise, the mesh definition component 64 selects the location of the mesh boundary box 74 that is associated with a maximal one of the count (i.e., OverlapCount[imx][imy] in the embodiment shown in FIG. 6) as the defined regular mesh (i.e., the regular mesh that is passed to the page layout generator module 14 with the processing results 26). In the embodiment shown in FIG. 6C, the location of the mesh boundary box that is associated with the maximum count is given by the lower left coordinates(x0−cw/2+imx, y0−ch2+imy), where imx-and imy are the x and y adjustments that were made to the starting location of the lower left coordinates of the mesh bounding box 74.

The following pseudo code describes an embodiment of the method of FIG. 5.

```
 1. Let: ix=0; iy=0; OverlapCount[ix][iy]=0;
 2. Set: xStart=x0−cw/2+ix; yStart=y0−ch/2+iy;
 3. Get the list of rectangles in the bounding box: R(M, N), where
        M=round(w/cw+0.5);
        N=round(h/ch+0.5);
        R(i, j)=Rectangle(xStart+i*cw, yStart+j*ch, cw, ch);
        i=0:M−1; j=0:N−1
 4. From the list of rectangles, count the number of rectangles that
overlap with the shape more than a pre-specified amount of overlap value
as OverlapCount[ix][iy]
 5. Update: ix++;
 6. if ix<cw, GOTO step 2; otherwise GOTO step 7
 7  Update: iy++;
 8. if iy<ch, GOTO step 3; otherwise GOTO step 9
 9. Get max OverlapCount and corresponding OverlapCount[imx, imy];
10. Obtain the list of rectangle which represents the shape:
        Let: xstart=x0−cw/2+imx; ystart=y0+ch/2+imy;
        From the list of rectangle R(i, j) where i=0:M−1; j=0:N−1
        R(i, j)=Rectangle(xstart, ystart, cw, ch),
        obtain the list of Rectangles which has From the list of
        rectangles, count the number of rectangle which overlap with the
        shape more than a pre-specified amount of overlap value as
        OverlapCount[ix][iy]
```

In some embodiments, the mesh definition component 64 determines whether or not the layout boundary is symmetric in one or more dimensions. In some embodiments, the mesh definition component 64 determines whether or not the layout boundary is symmetric based on a comparison of the center of mass components of the layout boundary to the center of mass components of the bounding box of the layout boundary. If the horizontal (e.g., x) center of mass coordinates are substantially the Same, then the layout boundary is considered to by symmetric in the horizontal dimension; if the vertical (e.g., y) center of mass coordinates are substantially the same, then the layout boundary is considered to by symmetric in the vertical dimension In response to a determination that the layout boundary is symmetric in, for example, the horizontal dimension and/or the vertical dimension, the mesh definition component 64 selects the set of cells contained by the mesh bounding box that is symmetrically distributed about the center of mass of the layout boundary in the horizontal dimension and/or the vertical dimension. In these embodiments, this symmetry constraint is prioritized over the cell maximization constraint described above. In some of these embodiments, this prioritization is achieved by restricting the mesh definition component 64 such that it only considers mesh bounding box positions that satisfy the symmetry constraint.

In some embodiments, the mesh definition component 64 divides an initial layout boundary (referred to herein as an "inclusive layout boundary") into boundary segments. For each of the non-rectangular ones of the boundary segments, the mesh definition component 64 defines a respective regular mesh of rectangular cells of uniform size that is aligned with a non-rectangular layout boundary such that a count of ones of the cells having at least a prescribed fraction of their size contained within the layout boundary is maximized. The mesh definition component 64 typically uses one of the mesh definitions described herein in order to define a respective regular mesh for each of the non-rectangular boundary segments. In this process, for each of these non-rectangular boundary segments, the mesh definition component 64 typically performing the defining of a respective regular mesh of rectangular cells of a respective uniform size (FIG. 2, block 32), the determining of a respective layout of frames within the boundary segment (FIG. 2, block 40), and the outputting of the respective views of the graphic objects arranged in accordance with the respective layout of the frames on the page (FIG. 2, block 44).

In some embodiments, the process of dividing an inclusive boundary into boundary segments involves identifying parallel linear partitions of the inclusive layout boundary that are aligned with respective portions of the inclusive layout boundary, and dividing the inclusive layout boundary along the partitions. There are many ways to detect prominent lines in the initial layout boundary. A exemplary line detection process is describe in Duda, R. O. and P. E. Hart, "Use of the Hough Transformation to Detect Lines and Curves in Pictures," *Comm. ACM, Vol.* 15, pp. 11-15 (January, 1972). Once detected, the prominent lines are used as a basis for segmenting the inclusive boundary.

Figure 7:
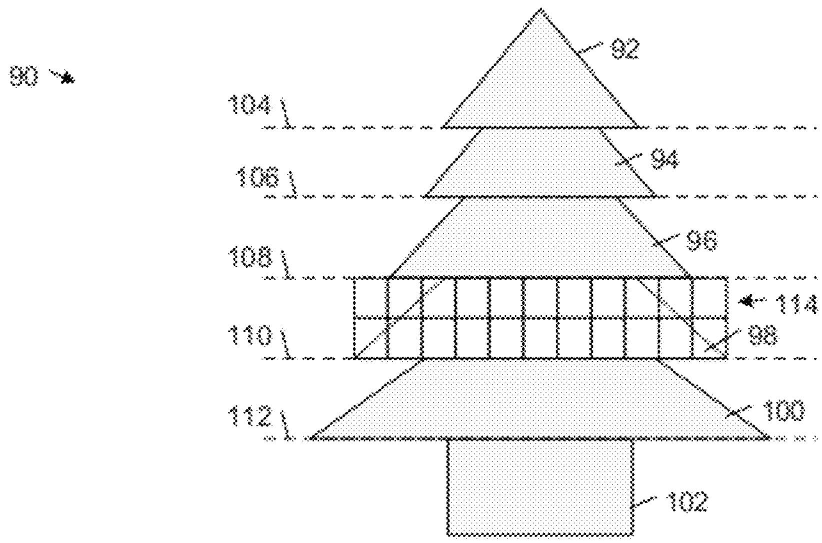
FIG. 7 is a diagrammatic view of an embodiment of a tree-shaped layout boundary that is divided into segments along parallel linear partitions in accordance with an embodiment of the invention.

FIG. 7 shows an exemplary inclusive layout boundary 90 that is divided into six boundary segments 92, 94, 96, 98, 100, 102 along five parallel linear partitions 104, 106, 108, 110, 112. For each of the non-rectangular boundary segments 92-100, the mesh definition component 64 defines a respective regular mesh (e.g., mesh 114) of rectangular cells of uniform size that is aligned with a non-rectangular layout boundary such that a count of ones of the cells having at least a prescribed fraction of their size contained within the layout boundary is maximized.

In some embodiments, for each of the non-rectangular boundary segments 92-100, the mesh definition component sets the respective uniform size of the cells such that a distance between adjacent ones of the parallel linear partitions is an integral multiple of a rectangular dimension of the cells, as shown in FIG. 7. In some embodiments, the cell size is modified so that exact multiples of cells fit between two adjacent linear partitions. For example, in some of these embodiments: for horizontal linear partitions, Nc=round(d/ch), and the new cell height is given by ch'=d/Nc; and for vertical linear partitions, Nc=round(d/cw), and the new cell width is given by cw'=d/Nc; where d is the distance between the two adjacent linear partitions.

The layout boundary processing module 56 passes the page layout generator module 54 a respective specification of the non-rectangular boundary segments 92-100 along with an associated regular mesh definition.

In some embodiments, the mesh definition component 64 also defines a respective regular mesh for the rectangular boundary segment 102 using any of the mesh definition methods described herein. In other embodiments, the layout boundary processing module 56 passes the page layout generator module 54 a specification of the boundary segment 102 without an associated regular mesh definition.

C. Page Layout Generator Module

The page layout generator module 54 includes a layout component 62, which determines the layout of frames within the layout boundary based on the locations of the cells with respect to the layout boundary (FIG. 2, block 46).

In some embodiments, the layout component 62 determines the layout of graphic object frames (see FIG. 2, block 40) by placing each of the graphic objects in a respective non-overlapping region within the layout boundary 18 that corresponds to a respective set of one or more of the cells of the regular mesh defined by the layout boundary processing module 16.

In some embodiments, the graphic objects are ranked with at least some of the graphic objects are ranked higher than other lower-ranked ones of the graphic objects. The graphic objects may be ranked, for example, manually by a user or automatically by an image analysis system. The rank can be base on various factors such as image quality, faces of people, and expression of the faces. In these embodiments, the layout component 62 assigns the higher ranked ones of the graphic objects to respective ones of the frames that are aligned with respective ones of the rectangular cells that are completely contained by the layout boundary 18, and assign the lower-ranked ones of the graphic objects to respective ones of the frames that are aligned with respective ones of the cells with respective fractions of their size outside the layout boundary.

For partial mesh cells along the edge of the layout boundary 18, edges of the layout boundary 18 can be used as clipping paths for cropping the views of the graphic objects 12 assigned to the partial cells. For example, in some embodiments, one or more of the lower-ranked ones of the graphic objects are cropped such that their respective views fit within the respective ones of the frames with a non-rectangular border cropped to a portion of the non-rectangular layout boundary. If more than a specified fraction (e.g., 50%) of a cell's area is inside the layout boundary 18, a graphic object (e.g., a graphic object that can be cropped) can be placed in the cell, and cropped and scaled based on content analysis in order to ensure that important contents (e.g. face regions) are preserved and shown through the frame instead of being clipped out. In some embodiments, if a cell has less than a specified fraction (e.g., 50%) of its area within the layout boundary 18, the cell is filled with an average color of the graphic object content in one or more adjacent cells; in other embodiments, a frame of a respective one (typically a lower ranked one) of the graphic objects is assigned to the partial cell; in still other embodiments, the graphic object assigned to an adjacent cell can by duplicated in the partial cell.

Figure 8:
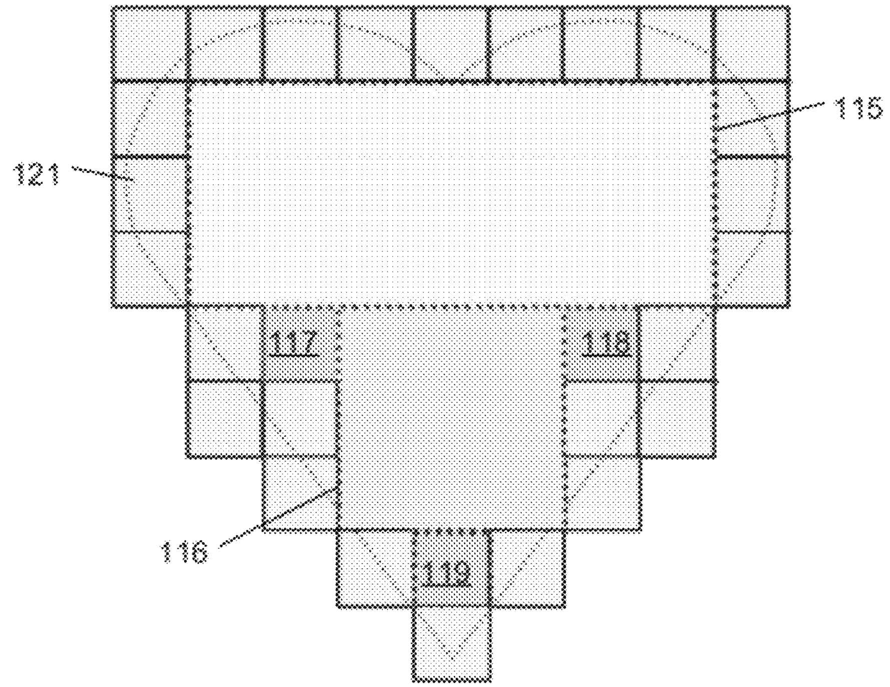
FIG. 8 is a diagrammatic view of a set of rectangular canvasses that are defined in a layout boundary in accordance with an embodiment of the invention.

Referring to FIG. 8, in some embodiments, the layout component 62 determines the layout of graphic object frames with respect to rectangular canvasses. In these embodiments, the layout component 62 determines one or more rectangular regions (referred to as "canvasses") within the layout boundary 18 by combining adjacent cells in the rectangular mesh defined by the layout boundary processing module 16. The layout component 62 then determines a respective layout of the graphic objects 12 in each of the determined rectangular regions using any of the graphic object layout methods described below. In some of these embodiments, the layout component 62 selects the single largest rectangle that can be formed by combining adjacent cells in the rectangular mesh as the layout canvass and determines a layout of the graphic objects in the resulting rectangular canvass using any of the method described below. In order to find all the canvasses, this process is repeated for uncombined cells until all the cells 115-119 that completely reside in the layout boundary 18 are found. In some embodiments the cells 121 on the layout boundary define a respective view for a single graphic object (see FIG. 10).

The layout component 62 generates each layout of graphic objects using any of a wide variety of different image layout processes, subject to any number of layout criteria. In some embodiments, the layout component 62 arranges the graphic objects 12 within a rectangular canvass subject to the following primary critera:

(a) graphic object aspect ratios are respected; and (b) graphic object borders (β) and spacing (σ) between adjacent graphic object borders are precisely specified.

Criterion (a) reflects the assumption that the process should not impose overlap or other hiding of image content unless specifically directed to do so; while criterion (b) provides accommodation for graphic object borders or other features of graphic design going into the final presentation. The layout component 62 creates a hew layout also based on the following secondary criteria:

(c) graphic object areas should be proportional to positive relative area values supplied with the graphic object; and (d) graphic object should occupy a maximum amount of the area within the rectangular canvass.

Figure 10:
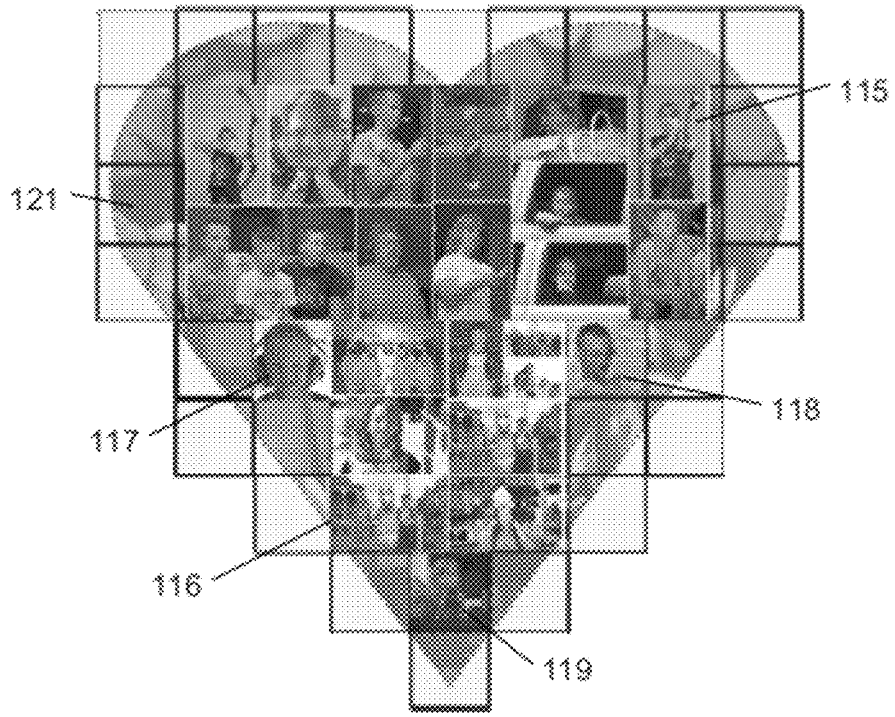
FIG. 10 is a diagrammatic view of an embodiment of an image collage that is generated in accordance with an embodiment of the invention.
Figure 9:
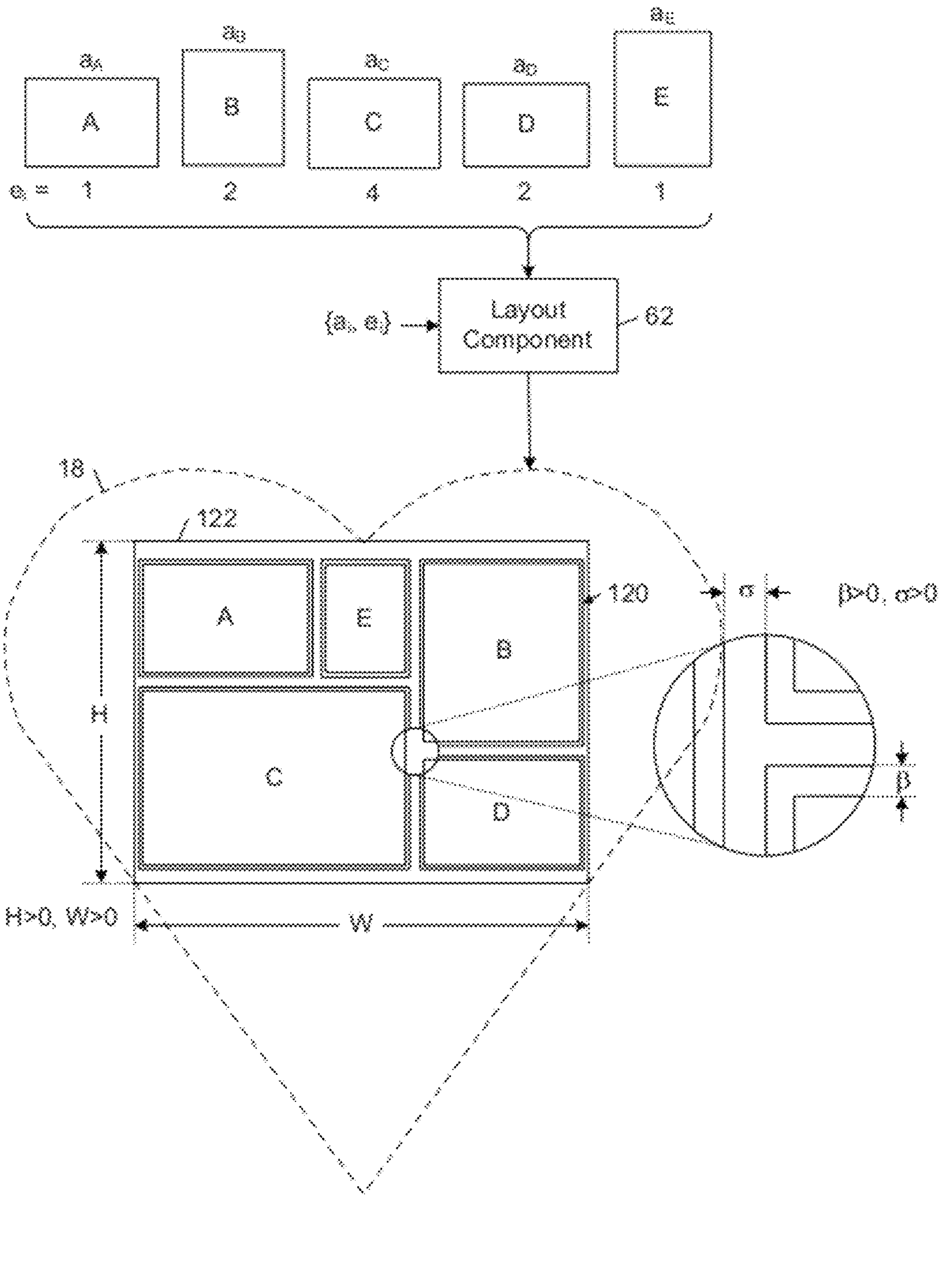
FIG. 9 is a diagrammatic view of an embodiment of the graphic object collage generation system of FIG. 1.

FIG. 9 shows a diagrammatic view of an embodiment of a graphic object collage generation process that is implemented by an embodiment of the layout component 62. The inputs to the layout component 62 are an aspect ratio ($a_i$) and a suggested relative area ($e_1$) for each graphic object i. In this embodiment, the layout component 62 produces a graphic object collage layout 120 in a single rectangular canvass 122 corresponding to the largest regular area that could be formed by combining adjacent cells in the rectangular mesh defined for the layout boundary 18. Because of the primary criteria, pairs of adjacent graphic objects and blocks of graphic objects in the layout 80 have equal heights or widths. As long as the borders and spacing are not so thick that they take up the entire canvas in either dimension (a weak restriction), any set of graphic objects will fit together in this way. However, it cannot be guaranteed that the secondary criteria will be satisfied. Considering criterion (c), for example, notice that image C, which has a suggested nominal size of 4, does not have area exactly four times that of either of the image A and E, which have suggested relative areas of 1. Considering criterion (d), although all the images are large enough to be easily visible, the layout 120 does not completely fill the canvass 122 in the vertical (height) direction. In further processing, the image may be slightly cropped so that the layout area will complete occupied the canvass 122. In another embodiment, decorative graphic elements may be placed in the partially enclosed cells 121 to fill up the empty space as shown in FIG. 10.

Figure 11:
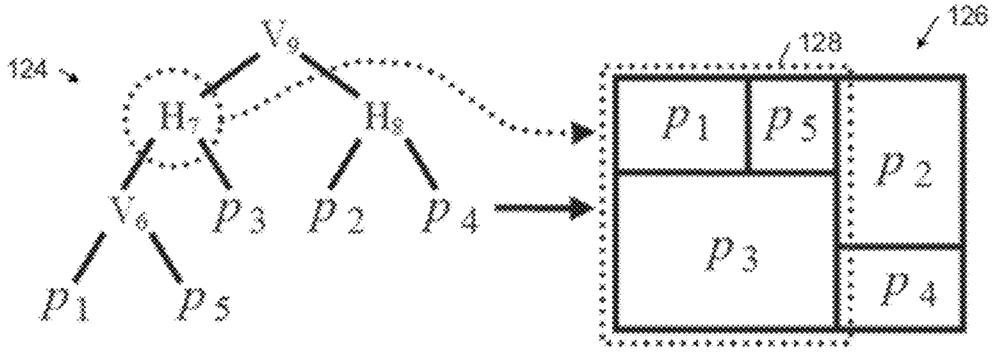
FIG. 11 is a diagrammatic view of a tree structure and a graphic object collage generated from the tree structure in accordance with an embodiment of the graphic object collage generation system of FIG. 1.

In these embodiments, the layout component 62 encodes the graphic object layout 120 as a binary tree 124 that induces a recursive partition of the canvas as illustrated in FIG. 11. In the tree 124 each terminal node corresponds to a respective image ($p_i$, . . . , $p_4$). Each interior node corresponds to a "bounding box" on the canvass 122, and its designation as either a horizontal ("H") cut or a vertical ("V") cut divides the box into two smaller boxes. The following table shows the bounding box dimensions for the exemplary layout 126 shown in FIG. 11. In this example, for nodes n≤5, $h_n$, and $w_n$ denote respectively the height and width for a graphic object, where n is the node index; but for nodes n>5, $h_n$ and $w_n$ denote the dimensions of a complete bounding box, including all borders and spacings contained therein (see, e.g., the bounding box 85 corresponding to node $H_7$). Generally, a table like this can be constructed quickly in a single depth-first traversal of the tree.

TABLE 3

Bounding box dimensions for layout 126 in FIG. 11.

| NODE LABEL | BOUNDING BOX HEIGHT | BOUNDING BOX WIDTH |
|---|---|---|
| n = 1, . . . , 5 | $h_n + 2\beta$ | $w_n + 2\beta$ |
| 6 | $h_1 + 2\beta$ | $w_1 + w_5 + \sigma + 4\beta$ |
| 7 | $h_6 + h_3 + \sigma + 2\beta$ | $w_6$ |
| 8 | $h_2 + h_4 + \sigma + 4\beta$ | $w_2 + 2\beta$ |
| 9 | $h_8$ | $w_7 + w_8 + \sigma$ |

The layout component 62 associates each tree having the form illustrated in FIG. 11 with a unique layout that satisfies the primary criteria and defines a precise area and position in the canvass 122 for each image. The layout component 62 computes the image areas subject to the primary criteria. This is accomplished by solving a system of N linear equations in N unknowns, where the variables are the image widths. Referring to the tree, we obtain one equation from each of the N-1 interior nodes, by equating dimensions of the bounding boxes of its two children: For example, in FIG. 9, the constraint furnished by node $H_7$ would be $W_6=W_3$. There are two alternative N-th constraints: one equating height of the root bounding box to the height of the canvas, and another for the width. Generally, only one of the two N-th constraints will yield a solution that fits on the canvas.

Additional details regarding the construction and operation of the layout component 62 are described in U.S. patent application Ser. No. 12/366,616, filed Feb. 5, 2009, and U.S. patent application Ser. No. 11/769,671, filed Jun. 27, 2007, and in Atkins, C. B. Blocked Recursive Image Composition, ACM Multimedia, 2008.

IV. Exemplary Operating Environment

Embodiments of the graphic object collage generation system 10 may be implemented by one or more discrete modules (or data processing components) that are not limited to any particular hardware, firmware, or software configuration. In the illustrated embodiments, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

The modules of the graphic object collage generation system 10 may be co-located on a single apparatus or they may be distributed across multiple apparatus; if distributed across multiple apparatus, these modules and the display 24 may communicate with each other over local wired or wireless connections, or they may communicate over global network connections (e.g., communications over the internet).

In some implementations, process instructions (e.g., machine-readable code, such as computer software) for implementing the methods that are executed by the embodiments of the graphic object collage generation system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the graphic object collage generation system 10 may be implemented in any one of a wide variety of electronic devices, including desktop computers, workstation computers, and server computers.

Figure 12:
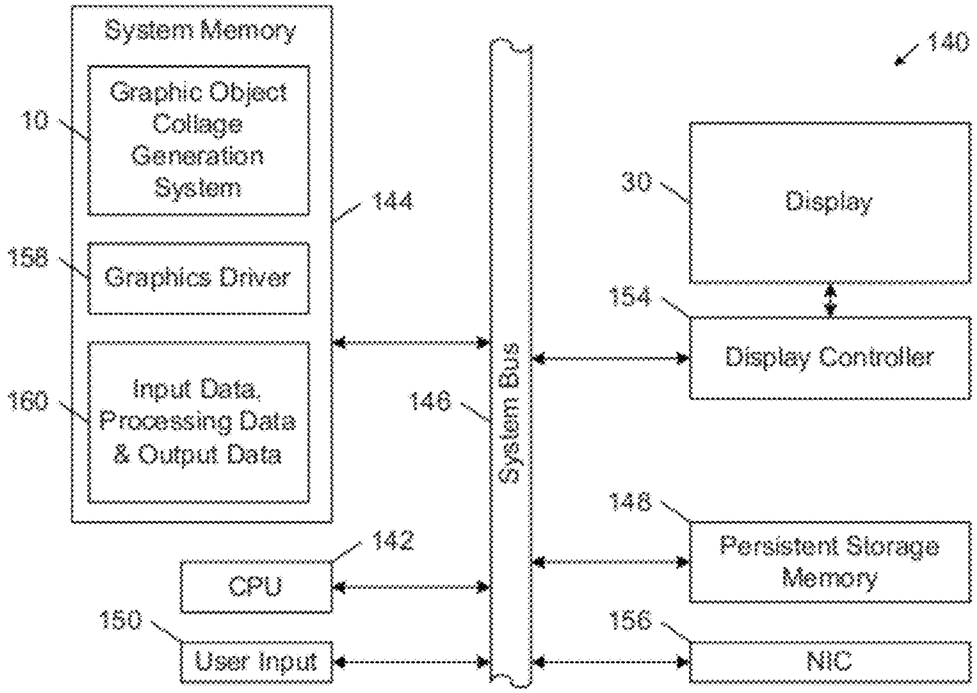
FIG. 12 is a block diagram of an embodiment of a computer system that implements an embodiment of the graphic object collage generation system of FIG. 1.

FIG. 12 shows an embodiment of a computer system 140 that can implement any of the embodiments of the graphic object collage generation system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 140 using one or more input devices 150 (e.g., a keyboard, a computer mouse, a microphone, joystick, and touch pad). Information may be presented through the user interface 28 (see FIG. 1), which is displayed to the user on the display 30 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 12, the system memory 144 also stores the graphic object collage generation system 10, a graphics driver 158, and processing information 160 that includes input data, processing data, and output data. In some embodiments, the graphic object collage generation system 10 interfaces with the graphics driver 158 (e.g., via a DirectX® component of a Microsoft Windows® operating system) to present the user interface 28 on the display monitor 30 for managing and controlling the operation of the graphic object collage generation system 10.

V. CONCLUSION

The embodiments that are described herein provide systems and methods that enable graphic object collages that conform to a non-rectangular layout boundary to be generated.

Other embodiments are within the scope of the claims.

The invention claimed is:

1. A method, comprising:

defining a mesh of rectangular cells of uniform size that is aligned with a non-rectangular layout boundary such that a count of ones of the cells having at least a prescribed fraction of their size contained within the layout boundary is maximized;

determining a layout of frames within the layout boundary based on locations of the cells with respect to the layout boundary, wherein the frames define respective size dimensions and positions of respective views of graphic objects on a page; and outputting the views of the graphic objects arranged in accordance with the layout of the frames on the page.

2. The method of claim 1, wherein the defining comprises:

positioning a mesh boundary box containing the mesh in a current location relative to the layout boundary;

for the current location, tallying a respective count of ones of the cells having a prescribed fraction of their size contained within the layout boundary;

repositioning the mesh boundary box in a new current location relative to the layout boundary;

repeating the tallying and the repositioning; and selecting the location of the mesh boundary box associated with a maximal one of the counts as the defined mesh.

3. The method of claim 1, further comprising:

dividing an inclusive layout boundary into boundary segments, wherein one of the boundary segments corresponds to the non-rectangular boundary;

for each of the boundary segments, performing the defining of a respective mesh of rectangular cells of a respective uniform size, the determining of a respective layout of frames within the boundary segment, and the outputting of the respective views of the graphic objects arranged in accordance with the respective layout of the frames on the page.

4. The method of claim 3, wherein the dividing comprises identifying parallel linear partitions of the inclusive layout boundary that are aligned with respective portions of the inclusive layout boundary, and dividing the inclusive layout boundary along the partitions.

5. The method of claim 4, further comprising for each of the boundary segments, setting the respective uniform size of the cells such that a distance between adjacent ones of the parallel linear partitions is an integral multiple of a rectangular dimension of the cells.

6. The method of claim 1, wherein the determining comprises aligning ones of the frames with respective ones of the cells.

7. The method of claim 1, wherein the determining comprises defining at least one frame that corresponds to a combination of adjacent ones of the cells.

8. The method of claim 1, wherein the determining comprises defining at least one frame with a non-rectangular border that is cropped to a portion of the non-rectangular layout boundary.

9. The method of claim 1, wherein the outputting comprises assigning each of one or more of the graphic objects to a respective one of the frames based on a ranking of ones of the graphic objects.

10. The method of claim 9, wherein some of the graphic objects are ranked higher than other lower-ranked ones of the graphic objects, and the assigning comprises assigning the higher ranked ones of the graphic objects to respective ones of the frames aligned with respective ones of the rectangular cells that are completely contained by the layout boundary and assigning the lower-ranked ones of the graphic objects to respective ones of the frames aligned with respective ones of the cells with respective fractions of their size outside the layout boundary.

11. The method of claim 10, further comprising cropping a given one of the lower-ranked ones of the graphic objects such that its respective view fits within a respective one of the frames with a nonrectangular border cropped to a portion of the non-rectangular layout boundary.

12. The method of claim 1, further comprising determining whether the layout boundary is symmetric in one or more symmetry dimensions; and wherein the defining comprises, in response to a determination that the layout boundary is symmetric in one or more symmetry dimensions, searching for an alignment of the mesh such that the cells are symmetrically distributed about a center location within the layout boundary in each of the one or more symmetry dimensions.

13. Apparatus, comprising:

a non-transitory computer-readable medium storing computer-readable instructions; and a processor coupled to the computer-readable medium to execute the instructions, and based at least in part on the execution of the instructions to:

define a mesh of rectangular cells of uniform size that is aligned with a non-rectangular layout boundary such that a count of ones of the cells having at least a prescribed fraction of their size contained within the layout boundary is maximized;

determine a layout of frames within the layout boundary based on locations of the cells with respect to the layout boundary, wherein the frames define respective size dimensions and positions of respective views of graphic objects on a page; and output the views of the graphic objects arranged in accordance with the layout of the frames on the page.

14. The apparatus of claim 13, wherein, to define the mesh of rectangular cells, the processor is to:

position a mesh boundary box containing the mesh in a current location relative to the layout boundary;

for the current location, tally a respective count of ones of the cells having a prescribed fraction of their size contained within the layout boundary;

reposition the mesh boundary box in a new current location relative to the layout boundary;

repeat the tallying and the repositioning; and select the location of the mesh boundary box associated with a maximal one of the counts as the defined mesh.

15. The apparatus of claim 13, wherein based at least in part on the execution of the instructions, the processor is to:

divide an inclusive layout boundary into boundary segments, wherein one of the boundary segments corresponds to the non-rectangular boundary;

for each of the boundary segments, define a respective mesh of rectangular cells of a respective uniform size, determine a respective layout of frames within the boundary segment, and output respective views of the graphic objects arranged in accordance with the respective layout of the frames on the page.

16. The apparatus of claim 13, wherein based at least in part on the execution of the instructions, the processor is to determine whether the layout boundary is symmetric in one or more symmetry dimensions; and wherein, to define the mesh of rectangular cells, the processor is to, in response to a determination that the layout boundary is symmetric in one or more symmetry dimensions, search for an alignment of the mesh such that the cells are symmetrically distributed about a center location within the layout boundary in each of the one or more symmetry dimensions.

17. At least one non-transitory computer-readable medium having computer-readable program code embodied therein, the computer-readable program code to be executed by a computer to:

define a mesh of rectangular cells of uniform size that is aligned with a non-rectangular layout boundary such that a count of ones of the cells having at least a prescribed fraction of their size contained within the layout boundary is maximized;

determine a layout of frames within the layout boundary based on locations of the cells with respect to the layout boundary, wherein the frames define respective size dimensions and positions of respective views of graphic objects on a page; and output the views of the graphic objects arranged in accordance with the layout of the frames on the page.

18. The at least one non-transitory computer-readable medium of claim 17, wherein, to define the mesh of rectangular cells, the computer-readable program code is to:

position a mesh boundary box containing the mesh in a current location relative to the layout boundary;

for the current location, tally a respective count of ones of the cells having a prescribed fraction of their size contained within the layout boundary;

reposition the mesh boundary box in a new current location relative to the layout boundary;

repeat the tallying and the repositioning; and select the location of the mesh boundary box associated with a maximal one of the counts as the defined mesh.

19. The at least one non-transitory computer-readable medium of claim 17, wherein the computer-readable program code is to be executed by the computer to:

divide an inclusive layout boundary into boundary segments, wherein one of the boundary segments corresponds to the non-rectangular boundary;

for each of the boundary segments, define a respective mesh of rectangular cells of a respective uniform size, determine a respective layout of frames within the boundary segment, and output respective views of the graphic objects arranged in accordance with the respective layout of the frames on the page.

20. The at least one non-transitory computer-readable medium of claim 17, wherein the computer-readable program code is to be executed by the computer to determine whether the layout boundary is symmetric in one or more symmetry dimensions; and wherein, to define the mesh of rectangular cells, in response to a determination that the layout boundary is symmetric in one or more symmetry dimensions, search for an alignment of the mesh such that the cells are symmetrically distributed about a center location within the layout boundary in each of the one or more symmetry dimensions.

* * * * *